(12) United States Patent
Shen et al.

(10) Patent No.: US 11,860,722 B2
(45) Date of Patent: Jan. 2, 2024

(54) COMPUTER-BASED SYSTEMS AND/OR COMPUTING DEVICES CONFIGURED FOR ROOT CAUSE ANALYSIS OF COMPUTING INCIDENTS USING MACHINE LEARNING TO DETERMINE WHEN A SOFTWARE VERSION CHANGE IS A CAUSE OF A COMPUTING INCIDENT

(71) Applicant: Capital One Services, LLC, McLean, VA (US)

(72) Inventors: Amy Shen, McLean, VA (US); Gaurav Jain, McLean, VA (US); George N. Irish, McLean, VA (US); Donald Gennetten, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 5 days.

(21) Appl. No.: 17/538,540

(22) Filed: Nov. 30, 2021

(65) Prior Publication Data
US 2022/0164246 A1 May 26, 2022

Related U.S. Application Data

(63) Continuation of application No. 16/952,420, filed on Nov. 19, 2020, now Pat. No. 11,188,411.

(51) Int. Cl.
*G06F 11/07* (2006.01)

(52) U.S. Cl.
CPC ........ *G06F 11/079* (2013.01); *G06F 11/0709* (2013.01); *G06F 11/0793* (2013.01)

(58) Field of Classification Search
CPC . G06F 11/0709; G06F 11/079; G06F 11/0793
See application file for complete search history.

(56) References Cited

U.S. PATENT DOCUMENTS 10,536,478 B2 1/2020 Kirti et al.
10,581,851 B1 3/2020 File et al.
(Continued)

OTHER PUBLICATIONS

Dobolyi, K., Soechting, E., & Weimer, W. (2011). Automating regression testing using web-based application similarities. International Journal on Software Tools for Technology Transfer, 13(2), pp. 111-129. doi:http://dx.doi.org/10.1007/s10009-010-0170-x (Year: 2011).*

*Primary Examiner* — Joseph R Kudirka
(74) *Attorney, Agent, or Firm* — Greenberg Traurig, LLP

(57) ABSTRACT

An example method includes receiving incident data for historical incidents of downtime or interrupted service. The incident data includes identification information about one or more first computing applications, devices, or services affected by the downtime or the interrupted service. The incident data further includes timing information relating to the historical incidents and version history information of the one or more first computing applications, devices, or services. The method further includes receiving root cause data indicating a cause of the historical incidents and receiving action data indicating a corrective or preventative action taken or to be taken in response to each of the historical incidents. The method further includes training a machine learning algorithm using the incident, root cause, and action data to create a trained model configured to determine a root cause and a new corrective or preventative action for a new incident.

21 Claims, 6 Drawing Sheets

(56) References Cited

U.S. PATENT DOCUMENTS

| | | |
|---|---|---|
| 11,093,319 B2 * | 8/2021 | Krishnaswamy ... G06F 11/0751 |
| 11,481,267 B2 * | 10/2022 | Raghavendra ...... G06F 16/9027 |
| 2016/0248799 A1 | 8/2016 | Ng et al. |
| 2018/0239658 A1 * | 8/2018 | Whitner .............. G06F 11/3409 |
| 2019/0089577 A1 * | 3/2019 | Misra .................... G06N 20/00 |
| 2019/0165988 A1 | 5/2019 | Wang et al. |
| 2019/0294484 A1 * | 9/2019 | Luo ....................... G06N 20/00 |
| 2019/0303258 A1 | 10/2019 | Kumar |
| 2019/0347148 A1 | 11/2019 | Gomes Pereira et al. |
| 2020/0065628 A1 | 2/2020 | Olnick et al. |
| 2020/0351383 A1 | 11/2020 | Jayaraman et al. |
| 2021/0019653 A1 | 1/2021 | Akimoto et al. |

\* cited by examiner

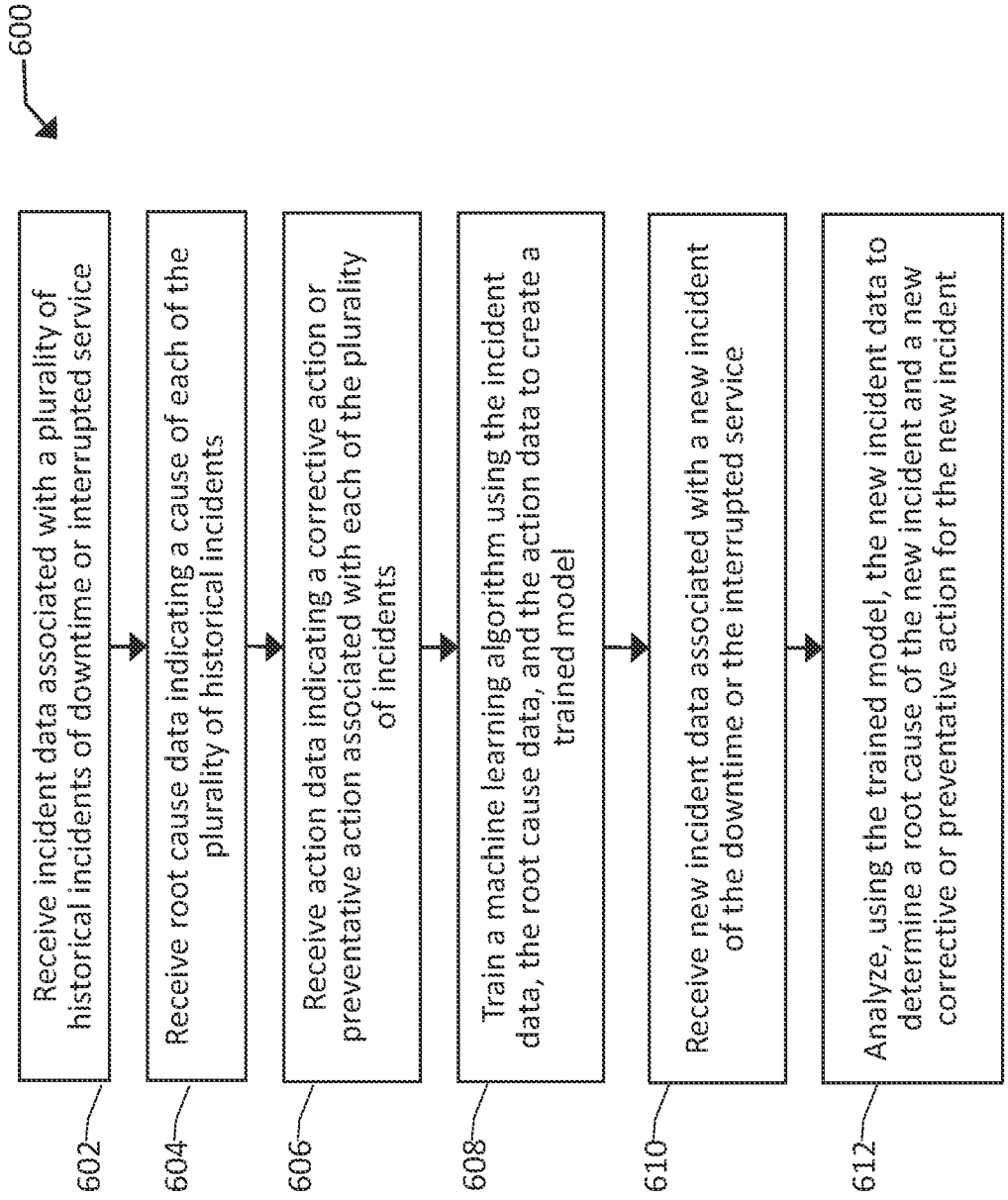

COMPUTER-BASED SYSTEMS AND/OR COMPUTING DEVICES CONFIGURED FOR ROOT CAUSE ANALYSIS OF COMPUTING INCIDENTS USING MACHINE LEARNING TO DETERMINE WHEN A SOFTWARE VERSION CHANGE IS A CAUSE OF A COMPUTING INCIDENT

CROSS-REFERENCE TO RELATED APPLICATION

This application is a continuation of and claims priority to U.S. patent application Ser. No. 16/952,420, filed on Nov. 19, 2020 (now granted as U.S. Pat. No. 11,188,411), the disclosure of which is hereby expressly incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of performing root cause analysis of computing incidents using machine learning.

BACKGROUND OF TECHNOLOGY

A computer network platform/system may include a group of computers (e.g., client devices (e.g., laptops, desktop computers, tablets, smartphone devices, internet of things (IOT) devices, etc.), servers, wireless routers or other networking devices) and other computing hardware devices that are linked together through one or more communication channels to facilitate communication among a wide range of users, including to address any issues that arise in the use of that group of computers.

SUMMARY OF DESCRIBED SUBJECT MATTER

In some embodiments, the present disclosure provides an exemplary technically improved computer-based method that includes at least receiving, by one or more processors, incident data associated with a plurality of historical incidents of downtime or interrupted service of one or more of a first computing application, a first computing device, or a first computing service. The incident data, for each of the plurality of historical incidents includes identification information of which one or more of the first computing application, the first computing device, or the first computing service were affected by the downtime or the interrupted service; timing information relating to when one or more of the first computing application, the first computing device, or the first computing service were affected by the downtime or the interrupted service; and version history information indicating one or more changes to the first computing application, the first computing device, or the first computing service which might have caused or were affected by the downtime or the interrupted service. The method further includes receiving, by the one or more processors, root cause data indicating a cause of each of the plurality of historical incidents. The method further includes receiving, by the one or more processors, action data indicating at least one corrective action, at least one preventative action, or both, taken or to be taken in response to each of the plurality of historical incidents. The method further includes training, by the one or more processors, a machine learning algorithm using the incident data, the root cause data, and the action data such that the training of the machine learning algorithm creates a trained model. The method further includes receiving, by the one or more processors, new incident data associated with a new incident of the downtime or the interrupted service of one or more of a second computing application, a second computing device, or a second computing service. The method further includes analyzing, by the one or more processor, using the trained model, the new incident data to determine a root cause of the new incident and a new corrective action, a new preventative action, or both, for the new incident.

In some embodiments, the present disclosure provides an exemplary technically improved computer-based system that includes at least the following components of a memory and at least one processor coupled to the memory. The processor is configured to receive incident data associated with a plurality of historical incidents of downtime or interrupted service of one or more of a first computing application, a first computing device, or a first computing service. The incident data, for each of the plurality of historical incidents, includes identification information of which one or more of the first computing application, the first computing device, or the first computing service were affected by the downtime or the interrupted service; timing information relating to when one or more of the first computing application, the first computing device, or the first computing service were affected by the downtime or the interrupted service; and version history information indicating one or more changes to the first computing application, the first computing device, or the first computing service which might have caused or were affected by the downtime or the interrupted service. The processor is further configured to receive root cause data indicating a cause of each of the plurality of historical incidents. The processor is further configured to receive action data indicating at least one corrective action, at least one preventative action, or both, taken or to be taken in response to each of the plurality of historical incidents. The processor is further configured to train a machine learning algorithm using the incident data, the root cause data, and the action data such that the training of the machine learning algorithm creates a trained model configured to determine a root cause and a new corrective action, a new preventive action, or both, for a new incident of the downtime or the interrupted service of one or more of a second computing application, a second computing device, or a second computing service.

In some embodiments, the present disclosure provides an exemplary technically improved non-transitory computer readable medium having instructions stored thereon that, upon execution by a computing device, cause the computing device to perform operations including receiving new incident data associated with a new incident of downtime or interrupted service of one or more of a first computing application, first computing device, or first computing service. The operations further include analyzing, using a trained model, the new incident data to determine a root cause of the new incident and a new corrective action, a new preventative action, or both, for the new incident. The trained model has been trained using historical incident data associated with a plurality of historical incidents of the downtime or the interrupted service of one or more of a second computing application, a second computing device, or a second computing service. The trained model has further been trained using root cause data indicating a cause of each of the plurality of historical incidents. The trained model has further been trained using action data indicating at least one corrective action, at least one preventative action, or both, taken or to be taken in response to each of the plurality of historical incidents.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 6 is a flowchart illustrating another process for performing root cause analysis of computing incidents using machine learning in accordance with one or more embodiments of the present disclosure.

DETAILED DESCRIPTION

Figure 1:
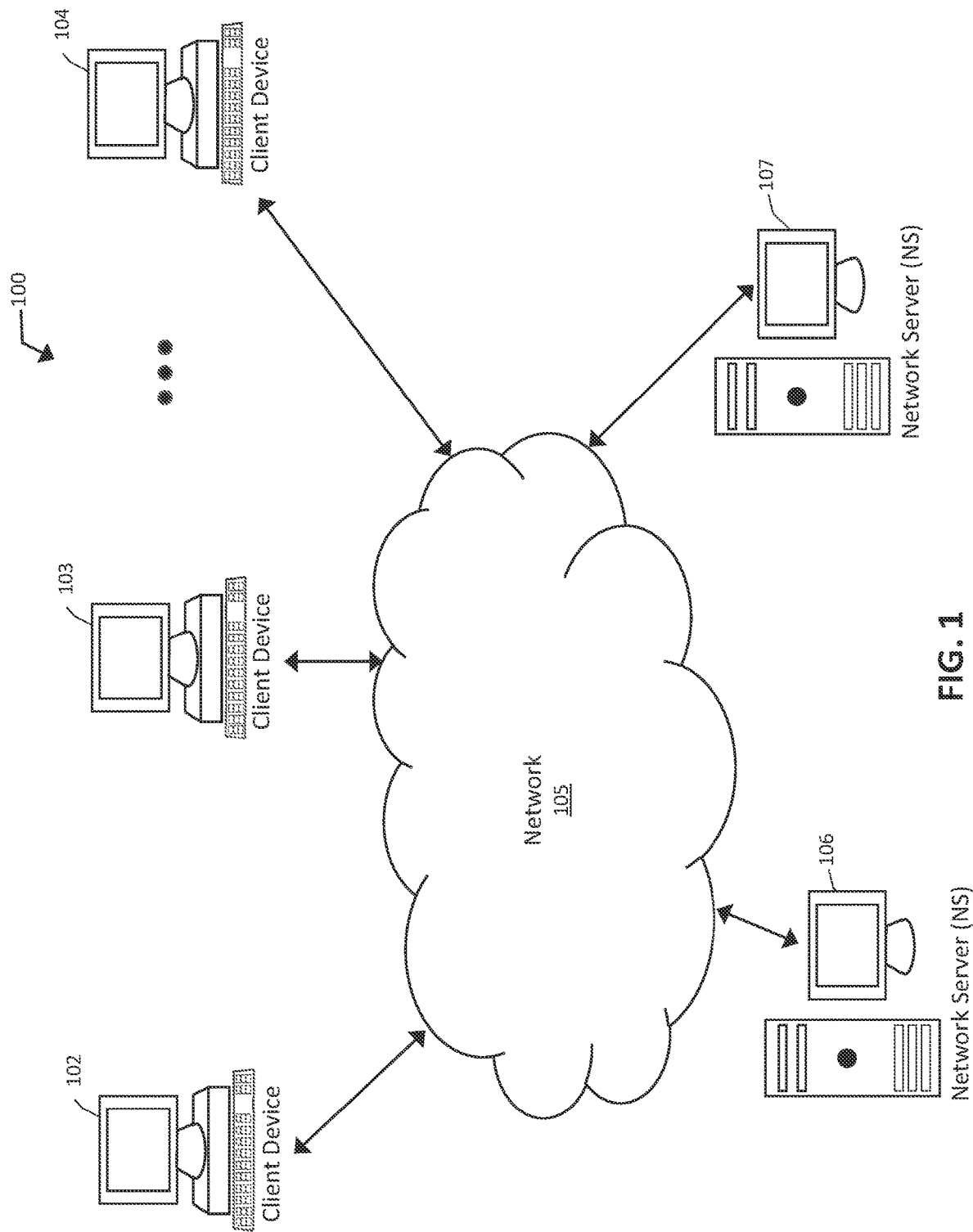
FIG. 1 is a block diagram depicting a computer-based system and platform in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

Described herein are methods, systems, computer readable media, etc. for performing root cause analysis of computing incidents using machine learning. Various embodiments described herein include technical aspects that perform root cause analysis of incidents in ways that may reduce the number of and/or severity of actual incidents of downtime or interrupted service of computing applications, devices, and/or services; may reduce the number of computing devices used to perform a root cause analysis of an incident; and/or may reduce the time it takes to perform a root cause analysis of a computing incident. The various embodiments described herein further include technical aspects that reduce the number of clicks, actions, or interactions that may be taken by users of client devices in performing root cause analysis of an incident.

The methods, systems, computer readable media, etc. for performing root cause analysis of computing incidents using machine learning described herein may include using incident data associated with historical incidents of downtime or interrupted service of computing applications, devices, and/or services. Such historical incident data may include information about each historical incident, such as when an incident took place; what applications, devices, and/or services were affected; how many users and/or locations were impacted by the incident; when the incident was corrected; and/or any other data related to the historical incident.

Root cause analysis of computing incidents using machine learning described herein may further include using root cause data of historical incidents. Root cause data may include information about the root cause of each of various historical incidents. A root cause of a historical incident may indicate a condition, problem, and/or other aspect of computing applications, devices, and/or services that caused a historical incident.

Furthermore, root cause analysis of computing incidents using machine learning described herein may further include using action data related to historical incidents. Action data may include information related to what action or actions were taken to correct a particular historical incident. The action or actions taken may be specific actions taken to remedy downtime or interrupted service, and/or may be specific actions taken to prevent an incident similar to a given historical incident from occurring again.

The historical incident data, the root cause data, and/or the action data may be input into an untrained machine learning algorithm to train the machine learning algorithm. The machine learning algorithm may be configured to recognize patterns in the various data inputted. With sufficient input data related to the historical incidents, the machine learning algorithm may yield a trained model that is be able to receive incident data related to a new incident of downtime or interrupted service of a computing application, device, and/or service. Based on the incident data related to the new incident, the trained model may predict and/or determine various data related to the new incident, such as root cause data and/or action data for the new incident. In this way, the trained model may use historical data related to historical incidents to output data about new incidents, and such output data may include root cause information about what caused an incident and/or action data about action to take to correct the incident and/or prevent similar incidents from happening again.

Such methods and systems as described herein may reduce the number of and/or severity of actual incidents of downtime or interrupted service of computing applications, devices, and/or services. For example, the technical aspects of training a machine learning algorithm to receive new incident data and output root cause and/or action data for the new incidents may result in faster determinations of root cause and/or actions to take than if new incidents were analyzed manually. Accordingly, the root causes and/or actions to take for various new incidents may be identified more quickly. This may have several advantages. For example, identifying a root cause for an incident may be useful to determine actions for preventing future incidents. The sooner such a root cause can be identified, the sooner preventative actions related to that root cause may be implemented, thereby preventing additional incidents related to the same or a similar root cause. Because additional incidents may be prevented using they systems and methods described herein, the technical aspects of quickly identifying root causes of incidents provides a technical solution for reducing the number of incidents of downtime and/or interrupted service to computing applications, devices, and/or services.

Another advantage includes determining the action data for a new incident more quickly than a manual analysis of a new incident. The action data may include specific actions for correcting the new incident itself and/or for preventing similar future incidents. Because a trained model as described herein may quickly determine actions for addressing and/or preventing an incident, those actions may be more quickly implemented. Therefore, the methods and systems described herein provide technical solutions that may reduce the number of incidents that occur, may reduce the amount of time used to respond to an incident, and/or may reduce the impact of an incident. For example, in various embodiments, incident data may be input a trained model as described herein while a new incident in ongoing or after the new incident has been corrected. If new incident data is input while the incident is ongoing, the action data output by the trained model may be used to take action and correct the incident while the new incident is ongoing. Such actions may reduce the severity of an ongoing incident by quickly addressing and correcting the incident. Even if the new incident data is only input into the trained model after the incident has been corrected, the action data may include actions to take that will prevent a future incident. Implementing such actions to prevent future incidents may also be time sensitive. In other words, computing applications, devices, and/or systems may still have improved functionality based on the systems and methods herein because the occurrence of new incidents may be reduced by more quickly identifying actions that will prevent future incidents and implementing those actions. As such, the systems and methods described herein provide technical solutions to the technical problems presented by downtime and/or interrupted service incidents by reducing the number and/or severity of such incidents.

The systems and methods described herein may also reduce the amount of time it takes to perform a root cause analysis and may increase the accuracy of root cause analyses performed. For example, an automated root cause analysis as described herein may occur more quickly than the same root cause analysis performed manually by one or more human users. Furthermore, the automated root cause analysis described herein may be more accurate than those performed by human users. For example, in a large organization, many different individuals may be involved with performing root cause analyses for varying incidents. Based on the level of expertise of those individuals in performing root cause analysis and/or other human factors, different individuals could have different outcomes even if performing a root cause analysis on the same incident. The systems and methods described herein advantageously provide for technical solutions to such imprecise root cause analysis, as the automated systems and methods described herein may perform root cause analysis more predictably and/or uniformly than if root cause analyses were performed by multiple different people for different incidents. This may increase the accuracy of such root cause analyses and thereby improve the functioning of the various computing applications, devices, and/services for which root cause analysis of incidents is performed.

The systems and methods described herein may also reduce the number of computing devices used to perform a root cause analysis of an incident. For example, in a manual root cause analysis, multiple individuals using multiple client devices may be used to perform a root cause analysis, review and revise the root cause analysis, finalize the root cause analysis, disseminate the root cause analysis and any action data derived therefrom, etc. Using the methods and systems described herein, the root cause analysis of a particular incident may be performed on one device or a limited number of devices as compared to the number of devices used in manual root cause analysis process. In this way, various embodiments may use decreased computing resources to perform a root cause analysis and disseminate the results thereof. In other words, various steps of a manual root cause analysis may be consolidated on one or a limited number of devices (e.g., determining action data and root cause data, disseminating action data to applicable persons), and some steps of the manual root cause analysis may be omitted completely (e.g., preparation or editing of multiple drafts or iterations of a root cause analysis by different users). In this way, the systems and methods described herein may improve the functioning of an organization's computing devices, systems, etc. by reducing the number of devices required to perform a root cause analysis on a new incident.

The embodiments described herein may therefore also reduce the number of clicks, touches, or other interactions taken by one or more users in an organization for a root cause analysis to be performed. As such, the methods and systems described herein features provide improved ease of use for a user. For example, instead of manually reviewing voluminous incident data related to a new incident and manually inputting root cause data and action data, a user may receive a report, document, etc. detailing an incident and including root cause and/or action data automatically determined by a trained model. Such embodiments drastically decrease the number of interactions required from a user in order to perform a root cause analysis.

Similarly, disseminating the root cause analysis to interested parties/users may also be performed automatically. For example, a trained model may determine automatically who to send a completed root cause analysis to. Such a determination may additionally or alternatively include determining parties to whom actions for preventing or correcting incidents may be assigned. In other words, the system may not only determine an action to take based on a new incident, but may also assign that action to a particular user or group of users and may communicate that action to the user or group of users automatically. Thus, the automatic dissemination of a root cause analysis and/or data related to the root cause analysis may further reduce the number of clicks, touches, or other interactions taken by users The root cause analysis systems and methods described herein therefore solve technological problems that exist with current root cause analysis systems. The current system of manually performing root cause analyses may limit the effectiveness of such analyses (e.g., if preventative actions are not implemented in time to prevent a new incident, if corrective actions are not taken in a timely manner such that incidents are amplified or propagate). By using the technological solutions necessarily rooted in computer technology described herein to improve root cause analysis, the technical functioning of devices used to perform root cause analysis and devices, applications, and/or services impacted by incidents may improve. Therefore, based at least in part the problems and solutions described herein, at least some embodiments of the present disclosure therefore result in improved functioning of electronic computing devices, network resources, and/or back end servers (including cloud computing resources).

The methods and systems described herein also represent demonstrable technological improvements over prior root cause analysis systems. In other words, the embodiments herein provide for a particular manner of training a machine learning algorithm for performing root cause analysis related to incidents for computing applications, devices, and/or services, rather than using conventional manual methods for performing such analysis.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XMIL, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (TRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
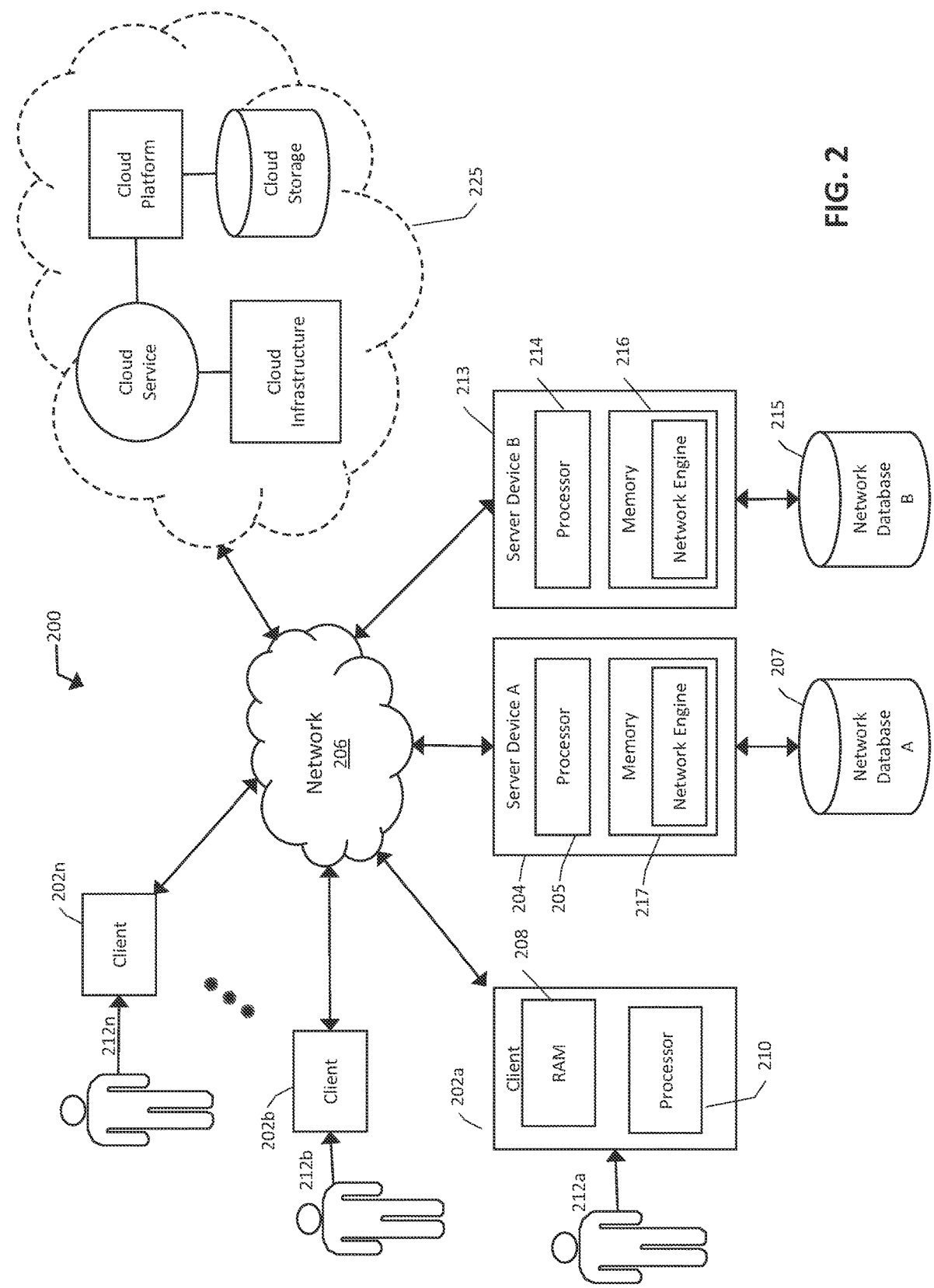
FIG. 2 is a block diagram depicting another computer-based system and platform in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b through 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a through 202n may also comprise a number of external or internal devices such as a mouse, a CD-ROM, DVD, a physical or virtual keyboard, a display, or other input or output devices. In some embodiments, examples of member computing devices 202a through 202n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a through 202n may be specifically programmed with one or more application programs in accordance with one or more principles/methodologies detailed herein. In some embodiments, member computing devices 202a through 202n may operate on any operating system capable of supporting a browser or browser-enabled application, such as Microsoft™ Windows™, and/or Linux. In some embodiments, member computing devices 202a through 202n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a through 202n, users 212a through 212n, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202a through 202n may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 3:
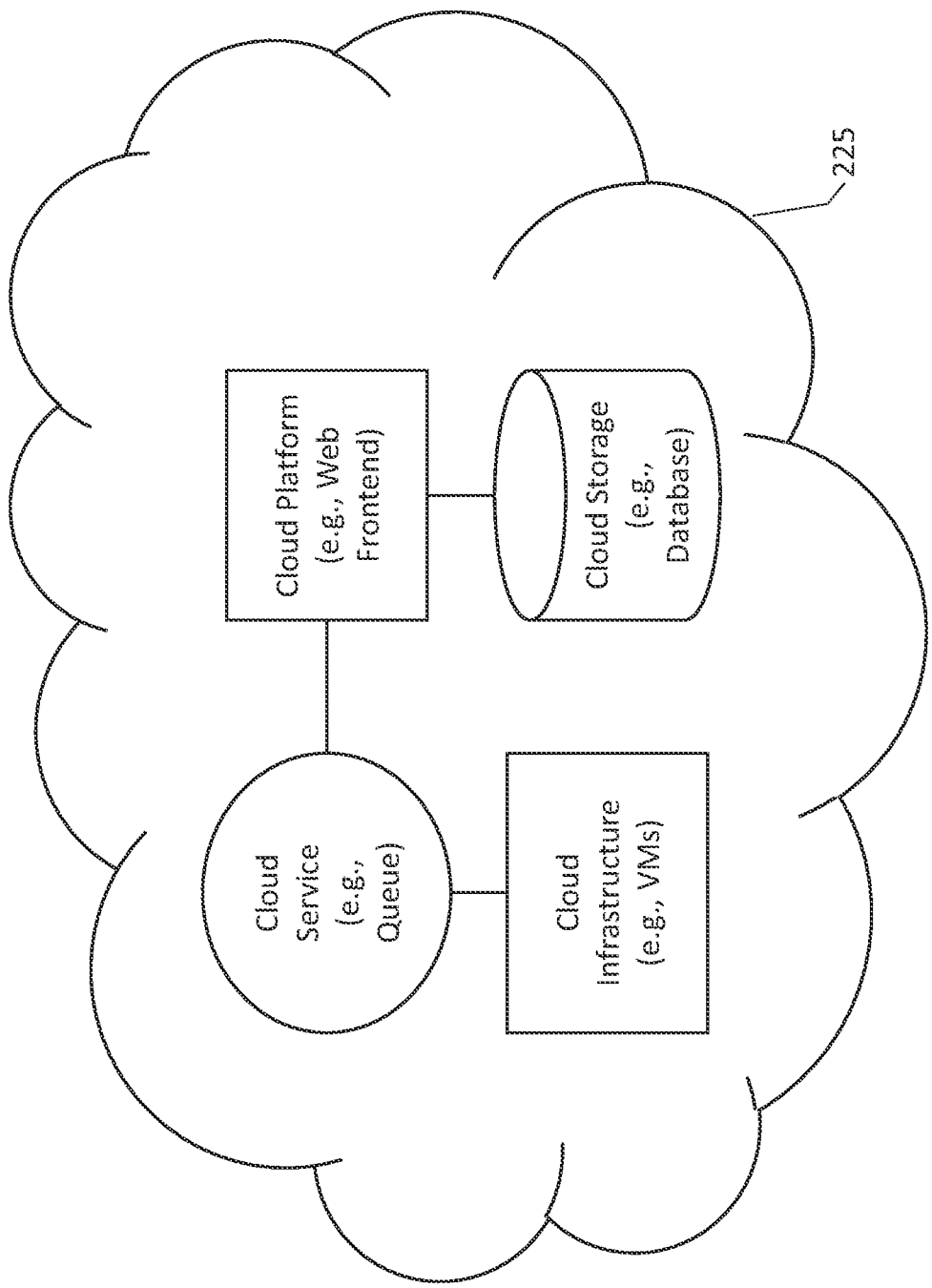
FIGS. 3 and 4 are diagrams illustrating implementations of cloud computing architecture/aspects with respect to which the disclosed technology may be specifically configured to operate, in accordance with one or more embodiments of the present disclosure.

As also shown in FIGS. 2 and 3, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 4:
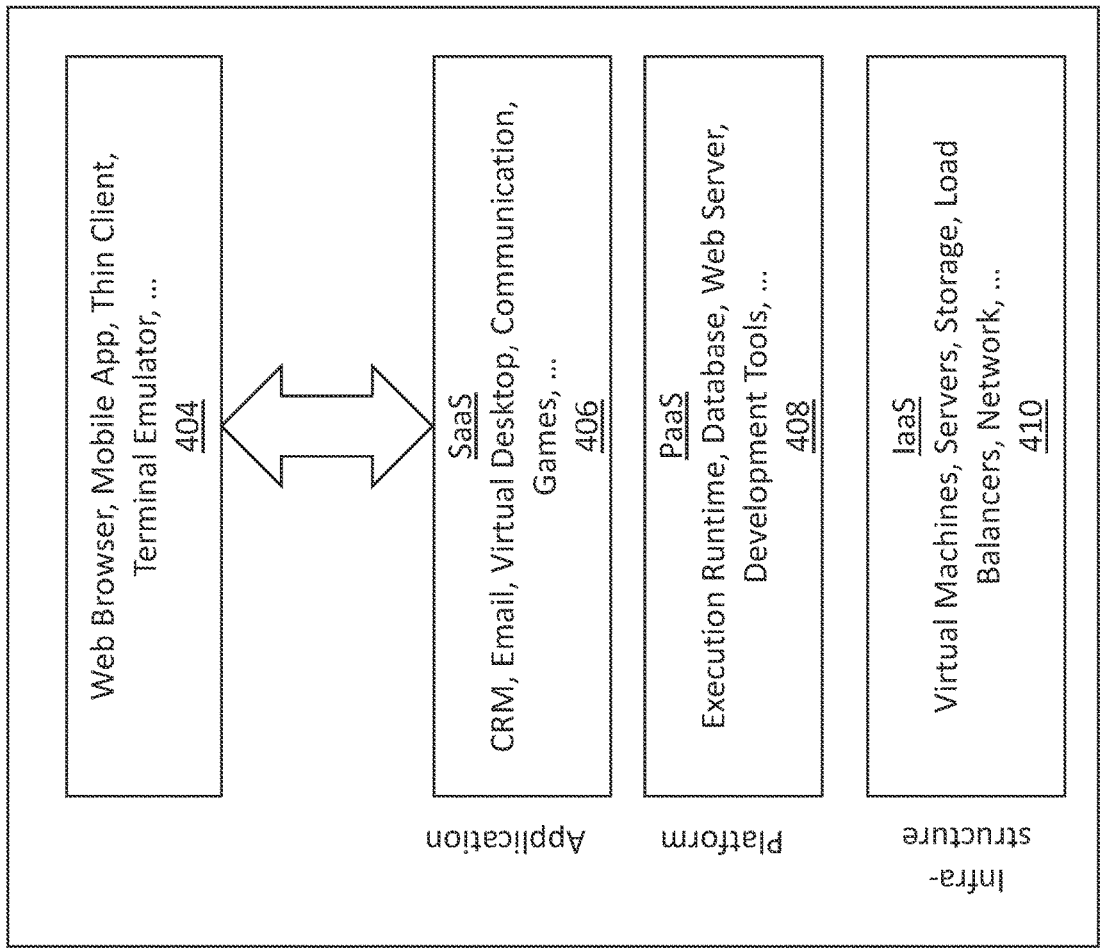

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 3 and 4 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

In various embodiments, different aspects described with respect to FIGS. 1-4 may be used. For example, incidents may occur on one or more of the client devices 102, 103, 104, or 202a through 202n; the networks 105 or 206; the server devices 106, 107, 204, or 213; the network databases 207 or 215; and/or the one or more cloud components 225. In addition, historical and/or new incidents as described herein may occur related to software applications, hardware components, software services, or any other aspect of the devices or components shown in FIGS. 1-4.

One or more of the client devices 102, 103, 104, or 202a through 202n may also be used to receive information related to incidents, such as an automated root cause analysis relating to a new incident and performed by a trained model. One or more of the client devices 102, 103, 104, or 202a through 202n may also be used to make manual changes to an automatically generated root cause analysis. Such changes may be used to further train or refine a machine learning algorithm or model, whether that machine learning algorithm is already a fully trained model or not. For example, a trained model may be used to perform an automated root cause analysis. The root cause analysis may be sent to one of the client devices 102, 103, 104, or 202a through 202n. The user may input into one of the client devices 102, 103, 104, or 202a through 202n changes for that root cause analysis or and of the data output related to that root cause analysis. Those changes may then be input back into the trained model to further train or refine the machine learning algorithm. In this way, the machine learning algorithm may continuously adapt.

Any of the client devices 102, 103, 104, or 202a through 202n; the networks 105 or 206; the server devices 106, 107, 204, or 213; the network databases 207 or 215; and/or the one or more cloud components 225 may also be used to store and/or train a machine learning algorithm used to perform root cause analysis for incidents as described herein. For example, an algorithm may be located on a server or cloud server, and historical incident data may also be located on the same or different servers or cloud servers. The historical incident data may then be input into an untrained machine learning algorithm until the machine learning algorithm is trained. The trained model may also be stored on a server or cloud server, and may receive new incident data from any of the client devices 102, 103, 104, or 202*a* through 202*n*; the networks 105 or 206; the server devices 106, 107, 204, or 213; the network databases 207 or 215; and/or the one or more cloud components 225. In other words, the client devices shown in FIGS. 1-4 may be used to implement the various methods and systems described herein.

Figure 5:
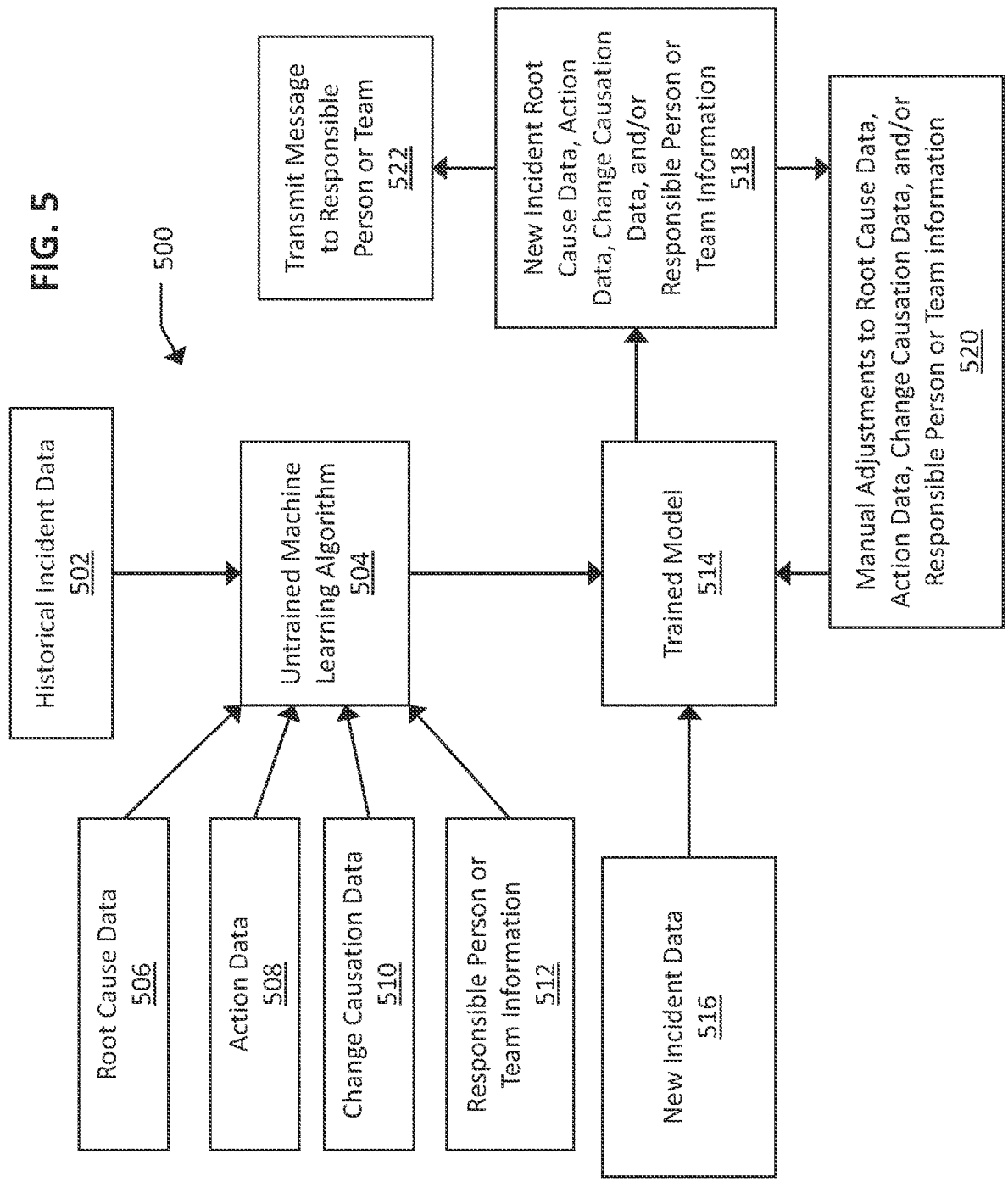
FIG. 5 is a flowchart illustrating a process for performing root cause analysis of computing incidents using machine learning in accordance with one or more embodiments of the present disclosure.

FIG. 5 is a flowchart illustrating a process 500 for performing root cause analysis of computing incidents using machine learning in accordance with one or more embodiments of the present disclosure. The process 500 includes operations that may be performed, for example, by one or more of the device or components shown in and discussed above with respect to FIGS. 1-4.

In the process 500, various inputs may be received at an untrained machine learning algorithm 504. In particular, the untrained machine learning algorithm 504 receives historical incident data 502, root cause data 506, action data 508, change causation data 510, and responsible person or team information 512. Each of these inputs may be used to train the untrained machine learning algorithm 504 to create a trained model 514.

The trained model 514 may be trained to recognize patterns related to computing incidents based on the various data and information input into the untrained machine learning algorithm 504. For example, the historical incident data 502 may be automatically gathered objective data related to a computing incident of downtime or interrupted service for one or more computing devices, applications, or services. Some or all of the root cause data 506, the action data 508, the change causation data 510, or the responsible person or team information 512 relating to the historical incidents in the historical incident data 502 may have been generated manually by one or more users performing a manual root cause analysis relating to the historical incidents. Accordingly, the untrained machine learning algorithm 504 may receive automatically generated data relating to historical incidents (e.g., the historical incident data 502) and may receive manually generated data relating to historical incidents (e.g., the root cause data 506, the action data 508, the change causation data 510, the responsible person or team information 512).

Thus, the untrained machine learning algorithm 504 may be trained to recognize patterns, correlations, etc. between the historical incident data 502 and the other types of data input into the untrained machine learning algorithm 504. In this way, the trained model 514 may receive new incident data 516 including automatically collected objective data relating to new incidents and may generate and output any of root cause data, action data, change causation data, and/or responsible person/team information for the new incident at 518. In other words, the trained model 514 has learned how to generate additional data for a new incident based on all the data inputs received at the untrained machine learning model 504. Any data similar to any of the root cause data 506, the action data 508, the change causation data 510, and/or the responsible person or team information 512 as described herein that is input to train a machine learning algorithm may be generated by a trained model upon input of new incident data. In other words, some or all the same types of data input to train an algorithm may be output by the algorithm based on new incident data. Further examples of such data types are described below. The data points in each of the data types input into an untrained machine learning algorithm may correlate to one or more of the data points in any category of data type. As such, the machine learning algorithm, once trained, may be able to determine and generate any of the data types input to train the machine learning algorithm. In other words, a trained model may recognize correlations between data of disparate types relating to historical incidents, so that more accurate data may be generated for future incidents.

In various embodiments, the historical incident data 502 may include various other types of data or information. For example, each of the historical incidents may be associated with a unique incident number. The timing information of the incident data may include other types of data such as how long (or start/stop times) of when an overall system was impacted by an incident, how long (or start/stop times) an end user or customer was impacted by an incident, when an incident was fully or partially detected, and/or when an incident was fully or partially resolved. Another example of historical incident data may be a type of product or service the incident affected. For example, organizations may develop their own proprietary systems that communicate with one another using proprietary protocols, such as an application programming interface (API) or application service version (ASV). The historical incident data may further indicate a product or service affected, including an API or ASV affected if applicable. In another example, the identification information of the application, device, or service may include information about a technology layer where the incident occurred. Other information included in the incident data may include a written description of an incident, a person, business unit, or group of users affected by the incident, or any other information related to an incident.

The incident data may further include information related to an incident. For example, if a new version of an application or service was rolled out around the incident, the procedures and steps (e.g., quality control steps) taken with regard to that new version rollout may be included in the incident data. Such data may correlate to and/or indicate that the incident was caused by the change, if, for example, a quality control step required for a particular rollout was omitted.

Further incident data may indicate a state of a historical incident. For example, whether the incident has been resolved or not may be included in the incident data. The state of action items related to an incident may also be included (e.g., has action been completed, when was action completed). In this way, the machine learning algorithm may be able to determine correlations between recurring incidents with an application, service, or device may be due to action items not being complete. In addition, the machine learning algorithm may learn to give less weight to action items that have been completed but have not yet resolved an incident based on the state information of the incident. In other words, the system may not generate recommendations of actions that appear not to have solved a given issue. Similarly, the incident data may include a manually entered state field for actions indicating whether the actions were helpful in resolving an incident, which may be used by a machine learning algorithm in a similar manner.

In various embodiments, the root cause data 506 may include various other types of data or information. For example, root cause data may be categorized into broader categories and sub-categories. As such, the root cause may be determined to be of a certain broad type in a higher division of classification, and a subdivision of that broader classification may indicate a more specific root cause that is of the type indicated by the broader, higher level classification. Similar to the categorization of a root cause, tags or themes may also be applied to an incident or root cause to categorize an incident or its root cause. For example, themes or tags that may be applied to an incident or root cause may be related to automatic scaling of an application, service, or device rollout; third-party vendor involved; internal communication issues; inadequate response to an alert or action; large data transfers; failed monitoring of systems; a recovery time objective (RTO) miss; testing or validation issue; geographical latency issues; etc. As such, a trained model may also be able to assign tags or themes to new incidents.

The root cause data 506 may include other information or data in various embodiments. For example, an impact or severity level rating (e.g., high, medium, low) may be included with a root cause.

In various embodiments, the action data 508 may include various other types of data or information. For example, an action may be categorized as critical or not critical (or may be categorized to be a degree of critical such as high, medium, low). The action data may further include a due date for any actions, and any particular items, services, applications, devices, etc. that the action may be applicable to. The action data may also include a written description of the description of the action to be performed, and may include a group or person to which a particular action is assigned.

In various embodiments, the change causation data 510 may include various other types of data or information. For example, the change causation data may include a binary (e.g., yes or no) indication of whether an incident was considered to have been caused by or related to a change in a device, application, or service. The change causation data may also indicate which particular change or changes to a device, application, or service is considered to have caused or be related to the incident. The change causation data may also include category for change that caused or is related to the incident. In other words, categories or tags may be used to more broadly characterize types of changes, and that data may further be used to train a machine learning algorithm, as it may correlate to some type of data desired.

In various embodiments, the responsible person or team information 512 may include various other types of data or information. For example, the responsible person or team may be a group of employees within a business, a person or persons in a business, or both (e.g., two responsible people within a responsible business group may be designated). In various embodiments, multiple responsible persons/groups may be assigned to different actions. For example, a corrective action may be assigned to a first person or team and a preventative action may be assigned to a different person or team. In another example, a person or team may be assigned to actually complete a task or action item, while another person or team may be assigned as being responsible for ensuring that the task or action item actually gets completed.

At an operation 520, a user may make manual adjustments to any of the outputted information from the trained model 514. For example, a user may adjust who the responsible person or team is for taking a follow up action related to a new incident. As such, the manual adjustment may be made to the responsible person or team information of the output at 518. A user may also manually change any of the other data output at 518. That information may be input back into the trained model 514, so that the machine learning algorithm may continue to iterate and learn more to generate more accurate or desirable data when new incident data is input into the trained model 514.

At an operation 522, the system may also transmit a message to a responsible person or team based on the information generated at 518 for the new incident. Such a message may include any of the data generated at 518. For example, the message may include action data related to the new incident, which may include one or more specific actions to be taken by the responsible person or team determined at 518. In this way, the determination of corrective and/or preventative actions related to a new incident, the determination of who should be responsible for taking those corrective and/or preventative actions, and transmission of a message notifying those responsible for the action(s) may all be automatically performed by the systems and methods described herein.

FIG. 6 is a flowchart illustrating another process 600 for performing root cause analysis of computing incidents using machine learning in accordance with one or more embodiments of the present disclosure. The process 600 includes operations that may be performed, for example, using the various components shown in and discussed above with respect to FIGS. 1-4.

At an operation 602, incident data associated with a plurality of historical incidents of downtime or interrupted service of one or more of a first computing application, a first computing device, or a first computing service is received at one or more computing devices where an untrained machine learning algorithm is stored and/or being trained. In some embodiments, a processor of a computing device may utilize the incident data associated with the plurality of historical incidents to train the machine learning algorithm.

The incident data, for each of the plurality of historical incidents, may include identification information of which one or more of the first computing application, the first computing device, or the first computing service were affected by the downtime or the interrupted service. In other words, the incident data includes information related to what computing applications, devices, or services were actually affected for each of the plurality of historical incidents. This may be useful for training the machine learning algorithm because different types of output data (e.g., action data) may be correlated to a type or identity of application, device, or service affected by an incident.

The incident data, for each of the plurality of historical incidents, may further include timing information relating to when one or more of the first computing application, the first computing device, or the first computing service were affected by the downtime or the interrupted service. The timing information may include a time of day and date when an incident began, a time of day and date when an incident ended, a duration of an incident, or other time related metrics related to incident. For example, other time related metrics may indicate how services, devices, or applications that are not completely unavailable may have delayed service, and how much those delays are for users attempting to use those services, devices, or applications.

The incident data, for each of the plurality of historical incidents, may further include version history information indicating one or more changes to the first computing application, the first computing device, or the first computing service which might have caused or were affected by the downtime or the interrupted service. The version history information may be a complete or partial list of version history information for a device, service, or application. The version history information may include a current version number, previous version number, time at which the current version was put into place, etc. The version history information may also include a change log or other information indicating what was changed in a respective version (in either a current version or previous versions). This information may be included in the incident data because some incidents and the data generated relating to the incidents may correlate to whether the computing device, service, or application recently underwent a change, what the change was related to, etc.

The incident data may further include, for example, impact data indicating at least one of a number of sites, number of devices, or number of users impacted by each of the plurality of historical incidents. This may indicate the scope of an incident. Such data may further indicate how critical those devices, sites, or users impacted by the incident was. Timing information associated with the devices, sites, or users may also be included. For example, an incident may affect more devices, sites, or users over time, so the impact data may include an indication of when specific devices, sites, and/or users were affected and for how long. Similarly, the impact data may include location or other identification data indicating identity of and/or location of affected devices, sites, and/or users.

At an operation 604, root cause data indicating a cause of each of the plurality of historical incidents is received at one or more computing devices where an untrained machine learning algorithm is stored and/or being trained. In some embodiments, a processor of a computing device may input the root cause data associated with the plurality of historical incidents into the machine learning algorithm for training. As described herein, the root cause data may indicate what is believed to be one or more actual causes of each of the plurality of historical incidents. This may be input to train the machine learning algorithm so that the machine learning algorithm may learn to determine root causes for future incidents based on new incident data input into a trained model.

At an operation 606, action data indicating at least one corrective action, at least one preventative action, or both, taken or to be taken in response to each of the plurality of historical incidents is received at one or more computing devices where the untrained machine learning algorithm is stored and/or being trained. In some embodiments, a processor of a computing device may input the action data associated with the plurality of historical incidents into the machine learning algorithm for training. As described herein, the action data may result in one or more preventative or correction actions taken to address each one of the plurality of historical incidents. This action data may be input to train the machine learning algorithm so that the machine learning algorithm may produce a trained model that is configured to determine recommended preventative or corrective actions for future incidents based on new incident data input.

At an operation 608, a machine learning algorithm is trained using the incident data, the root cause data, and the action data, such that the training of the machine learning algorithm produces a trained model.

Other types of data than incident data, root cause data, and action data may additionally or alternatively be received and used to train the machine learning algorithm as described herein. For example, change causation data indicating whether a historical incident is related to a change to the first computing application, the first computing device, or the first computing service affected may be input and used for training. In other words, a manually entered indication that an incident was related to a change to a device, application, or service may also be input to train the machine learning algorithm (and may also be output by a trained model based on received new incident data).

As another example, responsible person or team information indicating who is responsible for taking the corrective action or the preventative action for each of the plurality of historical incidents may be received and used to train the machine learning algorithm. In other words, past manually entered persons or teams assigned to take corrective or preventative actions in response to incidents may be input to train the algorithm. As such, once trained, the trained model may also generate automated recommendations for persons or teams to be assigned specific actions from the action data generated for a new incident.

In various examples, different type of machine learning algorithms, artificial intelligence (AI) algorithms, neural networks, etc. may be used as the untrained machine learning algorithm or as part of the untrained machine learning algorithm. Such algorithms may be used to produce a trained model as described herein. Example machine learning algorithms and/or methods including association rules (AR), collaborative filtering (CF), content-based filtering, tree based algorithms, bagging techniques including random forest and boosting, clustering, classification, etc., or any combination thereof may be used together with artificial neural networks embedded to produce a model for performing root cause analysis as described herein.

At an operation 610, new incident data associated with a new incident of the downtime or the interrupted service of one or more of a second computing application, a second computing device, or a second computing service is received. In some embodiments, a processor of a computing device may utilize the trained model to analyze the new incident data and generate additional data related to the new incident based on what was learned from the incident data, the root cause data, and the action data associated with the historical incidents.

In various embodiments, the new incident data related to the new incident may include data similar to the incident data associated with the historical incidents. For example, the new incident data may include new identification information of which one or more of the second computing application, the second computing device, or the second computing service were affected by the downtime or the interrupted service. In this way, the devices, applications, and/or services affected by the new incident may be identified. In addition, the new incident data may include new timing information relating to when one or more of the second computing application, the second computing device, or the second computing service were affected by the downtime or the interrupted service. Thus, the trained model may receive information related to exactly when the new incident occurred, as well as any other timing related information associated with the new incident collected. The new incident data further may further include new version history information indicating one or more changes to the second computing application, the second computing device, or the second computing service which might have caused or were affected by the downtime or the interrupted service. In this way, the trained model may also consider how the version history of a device, application, or service may have impacted or caused the incident.

The second computing application, the second computing device, or the second computing service may or may not be the same as the first computing application the first computing device, or the first computing service related to the historical incidents used to train the machine learning algorithm. In other words, a new incident may be related to a same application, device, or service for which historical incidents have already occurred, or the new incident may be related to a different application, device, or service than those for which historical incident data was used to train the machine learning algorithm. As such, even if a particular application, service, or device has not experienced an incident before, a processor of a computing device may utilize a trained model to generate data (e.g., action data, root cause data, responsible person/team information) relating to the new incident.

In particular, at an operation 612, a processor of a computing device may utilize the trained model to analyze the new incident data to determine a root cause of the new incident as well as a new corrective action, a new preventative action, or both, for the new incident. As such, machine learning and artificial intelligence may be used to perform root cause analysis for computing incidents.

At least some aspects of the present disclosure will now be described with reference to the following numbered clauses.

1. A method comprising:
    receiving, by one or more processors, incident data associated with a plurality of historical incidents of downtime or interrupted service of one or more of a first computing application, a first computing device, or a first computing service, wherein the incident data, for each of the plurality of historical incidents, comprises:
        identification information of which one or more of the first computing application, the first computing device, or the first computing service were affected by the downtime or the interrupted service;
        timing information relating to when one or more of the first computing application, the first computing device, or the first computing service were affected by the downtime or the interrupted service; and
        version history information indicating one or more changes to the first computing application, the first computing device, or the first computing service which might have caused or were affected by the downtime or the interrupted service;
    receiving, by the one or more processors, root cause data indicating a cause of each of the plurality of historical incidents;
    receiving, by the one or more processors, action data indicating at least one corrective action, at least one preventative action, or both, taken or to be taken in response to each of the plurality of historical incidents;
    training, by the one or more processors, a machine learning algorithm using the incident data, the root cause data, and the action data such that the training of the machine learning algorithm creates a trained model;
    receiving, by the one or more processors, new incident data associated with a new incident of the downtime or the interrupted service of one or more of a second computing application, a second computing device, or a second computing service; and
    analyzing, by the one or more processor, using the trained model, the new incident data to determine:
        a root cause of the new incident, and
        a new corrective action, a new preventative action, or both, for the new incident.

2. The method of clause 1, wherein the new incident data comprises:
    new identification information of which one or more of the second computing application, the second computing device, or the second computing service were affected by the downtime or the interrupted service;
    new timing information relating to when one or more of the second computing application, the second computing device, or the second computing service were affected by the downtime or the interrupted service; and
    new version history information indicating one or more changes to the second computing application, the second computing device, or the second computing service which might have caused or were affected by the downtime or the interrupted service.

3. The method of clause 1, wherein the second computing application, the second computing device, or the second computing service affected by the new incident is one or more of the first computing application, the first computing device, or the first computing service related to the plurality of historical incidents.

4. The method of clause 1, wherein the second computing application, the second computing device, or the second computing service affected by the new incident is different from the first computing application, the first computing device, or the first computing service related to the plurality of historical incidents.

5. The method of clause 1, further comprising:
    receiving, by the one or more processors, change causation data indicating whether each of the plurality of historical incidents is related to a first change to the first computing application, the first computing device, or the first computing service affected; and
    wherein the training of the machine learning algorithm further comprises training the machine learning algorithm using the change causation data.

6. The method of clause 5, wherein the analyzing of the new incident data using the trained model further comprises determining whether the new incident is related to a second change to the second computing application, the second computing device, or the second computing service.

7. The method of clause 6, wherein:
    the new incident data comprises new version history information indicating one or more changes to the second computing application, the second computing device, or the second computing service which might have caused or were affected by the downtime or the interrupted service; and
    the determining whether the new incident is related to the second change is based at least in part on the new version history information.

8. The method of clause 1, further comprising:
    receiving, by the one or more processors, responsible person or team information indicating who is responsible for taking the corrective action or the preventative action for each of the plurality of historical incidents; and
    wherein the training of the machine learning algorithm further comprises training the machine learning algorithm using the responsible person or team information.

9. The method of clause 8, wherein the analyzing of the new incident data using the trained model further comprises determining a new responsible person or team responsible for taking the new corrective or the new preventative action for the new incident.

10. A system comprising:
a memory; and
at least one processor coupled to the memory, the processor configured to:
receive incident data associated with a plurality of historical incidents of downtime or interrupted service of one or more of a first computing application, a first computing device, or a first computing service, wherein the incident data, for each of the plurality of historical incidents, comprises:
identification information of which one or more of the first computing application, the first computing device, or the first computing service were affected by the downtime or the interrupted service;
timing information relating to when one or more of the first computing application, the first computing device, or the first computing service were affected by the downtime or the interrupted service; and
version history information indicating one or more changes to the first computing application, the first computing device, or the first computing service which might have caused or were affected by the downtime or the interrupted service;
receive root cause data indicating a cause of each of the plurality of historical incidents;
receive action data indicating at least one corrective action, at least one preventative action, or both, taken or to be taken in response to each of the plurality of historical incidents; and
train a machine learning algorithm using the incident data, the root cause data, and the action data such that the training of the machine learning algorithm creates a trained model configured to determine a root cause and a new corrective action, a new preventive action, or both, for a new incident of the downtime or the interrupted service of one or more of a second computing application, a second computing device, or a second computing service.

11. The system of clause 10, wherein the second computing application, the second computing device, or the second computing service affected by the new incident is one or more of the first computing application, the first computing device, or the first computing service related to the plurality of historical incidents.

12. The system of clause 10, wherein the second computing application, the second computing device, or the second computing service affected by the new incident is different from the first computing application, the first computing device, or the first computing service related to the plurality of historical incidents.

13. The system of clause 10, wherein the root cause data and the action data are manually entered by one or more users for each of the plurality of historical incidents.

14. The system of clause 13, wherein the incident data is automatically gathered for each of the plurality of historical incidents.

15. The system of clause 14, wherein the incident data further comprises for each of the plurality of historical incidents: impact data indicating at least one of a number of sites, number of devices, or number of users impacted by each of the plurality of historical incidents.

16. A non-transitory computer readable medium having instructions stored thereon that, upon execution by a computing device, cause the computing device to perform operations comprising:
receiving new incident data associated with a new incident of downtime or interrupted service of one or more of a first computing application, first computing device, or first computing service; and
analyzing, using a trained model, the new incident data to determine:
a root cause of the new incident, and
a new corrective action, a new preventative action, or both, for the new incident;
wherein the trained model has been trained using:
historical incident data associated with a plurality of historical incidents of the downtime or the interrupted service of one or more of a second computing application, a second computing device, or a second computing service;
root cause data indicating a cause of each of the plurality of historical incidents; and
action data indicating at least one corrective action, at least one preventative action, or both, taken or to be taken in response to each of the plurality of historical incidents.

17. The non-transitory computer readable medium of clause 16, wherein the historical incident data, for each of the plurality of historical incidents, comprises:
identification information of which one or more of the second computing application, the second computing device, or the second computing service were affected by the downtime or the interrupted service;
timing information relating to when one or more of the second computing application, the second computing device, or the second computing service were affected by the downtime or the interrupted service; and
version history information indicating one or more changes to the second computing application, the second computing device, or the second computing service which might have caused or were affected by the downtime or the interrupted service.

18. The non-transitory computer readable medium of clause 17, wherein the analyzing of the new incident data using the trained model further comprises determining whether the new incident is related to a change to the second computing application, the second computing device, or the second computing service based at least in part on the version history information.

19. The non-transitory computer readable medium of clause 16, wherein the analyzing of the new incident data using the trained model further comprises determining a person or team responsible for taking the new corrective action or the new preventative action for the new incident.

20. The non-transitory computer readable medium of clause 16, wherein the analyzing of the new incident data using the trained model further comprises determining one or more persons or teams impacted by the new incident.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 3 and 4) and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
 receiving, by one or more processors, new incident data associated with a new incident of downtime or an interrupted service of one or more of a first computing application, a first computing device, or a first computing service; and
 determining, by the one or more processors, by inputting the new incident data into a trained machine learning model, that the new incident is related to a first change to the first computing application, the first computing device, or the first computing service, wherein:
  the trained machine learning model has been trained using change causation data indicating whether each of a plurality of historical incidents of downtime or interrupted service of at least one second computing application, at least one second computing device, or at least one second computing service is related to one or more second changes to the at least one second computing application, the at least one second computing device, or the at least one second computing service; and
  training of the trained machine learning model is further based on incident data associated with each of the plurality of historical incidents, wherein the incident data, for each of the plurality of the historical incidents, comprises version history information indicating one or more changes to the at least one second computing application, the at least one second computing device, or the at least one second computing service.

2. The method of claim 1, wherein the incident data, for each of the plurality of the historical incidents, further comprises at least one of:
 identification information of which one or more of the at least one second computing application, the at least one second computing device, or the at least one second computing service were affected by the downtime or the interrupted service; or
 timing information relating to when one or more of the at least one second computing application, the at least one second computing device, or the at least one second computing service were affected by the downtime or the interrupted service.

3. The method of claim 1, wherein the new incident data comprises, for the new incident of downtime or interrupted service, at least one of:
 identification information of which one or more of the first computing application, the first computing device, or the first computing service was affected by the downtime or the interrupted service;
 timing information relating to when the first computing application, the first computing device, or the first computing service were affected by the downtime or the interrupted service; or version history information indicating one or more changes to the first computing application, the first computing device, or the first computing service.

4. The method of claim 1, wherein the determining that the new incident is related to the first computing application, the first computing device, or the first computing service data using the trained machine learning model further comprises identifying a change to the first computing application, the first computing device, or the first computing service that caused the new incident.

5. The method of claim 1, wherein the first computing application, the first computing device, or the first computing service affected by the new incident is different from the at least one second computing application, the at least one second computing device, or the at least one second computing service related to the plurality of historical incidents.

6. The method of claim 1, wherein training of the trained machine learning model is further based on action data indicating at least one corrective action, at least one preventative action, or both, taken or to be taken in response to each of the plurality of historical incidents.

7. The method of claim 6, further comprising determining, by the one or more processors using the trained machine learning model, a new corrective action, a new preventative action, or both, for the new incident.

8. The method of claim 1, wherein the determination that the new incident is related to the first change to the first computing application, the first computing device, or the first computing service is based at least in part on version history information of the first computing application, the first computing device, or the first computing service.

9. The method of claim 1, wherein the training of the trained machine learning model is further based on responsible person or team information indicating who is responsible for taking a corrective action or a preventative action, or both for each of the plurality of historical incidents.

10. The method of claim 9, further comprising determining, by the one or more processors using the trained machine learning model, a new responsible person or team responsible for taking a new corrective or a new preventative action related to the new incident.

11. A system comprising:
a memory; and
at least one processor coupled to the memory, the at least one processor configured to:
receive change causation data indicating whether each of a plurality of historical incidents of downtime or an interrupted service is related to a first change to one or more of a first computing application, a first computing device, or a first computing service, wherein the change causation data comprises version history information indicating one or more changes to the first computing application, the first computing device, or the first computing service; and
train a machine learning algorithm using the change causation data such that the training of the machine learning algorithm creates a trained machine learning model configured to determine that a new incident is related to a second change to one or more of the first computing application or a second computing application, the first computing device or a second computing device, or the first computing service or a second computing service, wherein the new incident is related to the downtime or the interrupted service of one or more of the first computing application or the second computing application, the first computing device or the second computing device, or the first computing service or the second computing service.

12. The system of claim 11, wherein the first computing application, the first computing device, or the first computing service affected by the new incident is different from the second computing application, the second computing device, or the second computing service.

13. The system of claim 11, wherein the change causation data is manually specified by one or more users for each of the plurality of historical incidents, such that the change causation data comprises at least an indication that the first change caused the downtime or the interrupted service.

14. The system of claim 11, wherein the processor is further configured to receive new incident data related to the new incident and determine, using the trained machine learning model, that a change to the first computing application or the second computing application, the first computing device or the second computing device, or the first computing service or the second computing service caused the new incident.

15. The system of claim 11, wherein the change causation data further comprises, for each one of the plurality of historical incidents, at least one of:
identification information of which one or more of the first computing application, the first computing device, or the first computing service were affected by the downtime or the interrupted service; or
timing information relating to when one or more of the first computing application, the first computing device, or the first computing service were affected by the downtime or the interrupted service.

16. The system of claim 11, wherein, for each of the plurality of historical incidents, the change causation data further comprises impact data indicating at least one of a number of sites, a number of devices, or a number of users impacted by each of the plurality of historical incidents.

17. A non-transitory computer readable medium having instructions stored thereon that, upon execution by a computing device, cause the computing device to perform operations comprising:
receiving new incident data associated with a new incident of downtime or an interrupted service of one or more of a first computing application, a first computing device, or a first computing service; and
determining, by inputting the new incident data into a trained machine learning model, that the new incident is related to a first change to the first computing application, the first computing device, or the first computing service;
wherein the trained machine learning model has been trained using:
historical incident data associated with a plurality of historical incidents of the downtime or the interrupted service of one or more of a second computing application, a second computing device, or a second computing service, wherein the historical incident data, for each of the plurality of historical incidents, comprises version history information indicating one or more changes to the second computing application, the second computing device, or the second computing service which might have caused or were affected by the downtime or the interrupted service; and
change causation data indicating whether each of the plurality of historical incidents is related to a second change to the second computing application, the second computing device, or the second computing service.

18. The non-transitory computer readable medium of claim 17, wherein the historical incident data, for each of the plurality of historical incidents, further comprises at least one of:
   identification information of which one or more of the second computing application, the second computing device, or the second computing service were affected by the downtime or the interrupted service; or
   timing information relating to when one or more of the second computing application, the second computing device, or the second computing service were affected by the downtime or the interrupted service.

19. The non-transitory computer readable medium of claim 18, wherein the analyzing of the new data using the trained machine learning model further comprises determining that the new incident is related to the first change based at least in part on the version history information.

20. The non-transitory computer readable medium of claim 17, wherein the analyzing of the new data using the trained machine learning model further comprises determining a person or a team responsible for taking a new corrective action or a new preventative action for the new incident.

21. The non-transitory computer readable medium of claim 17, wherein the analyzing of the new data using the trained machine learning model further comprises determining one or more persons or teams impacted by the new incident.

* * * * *